Patented Feb. 8, 1949

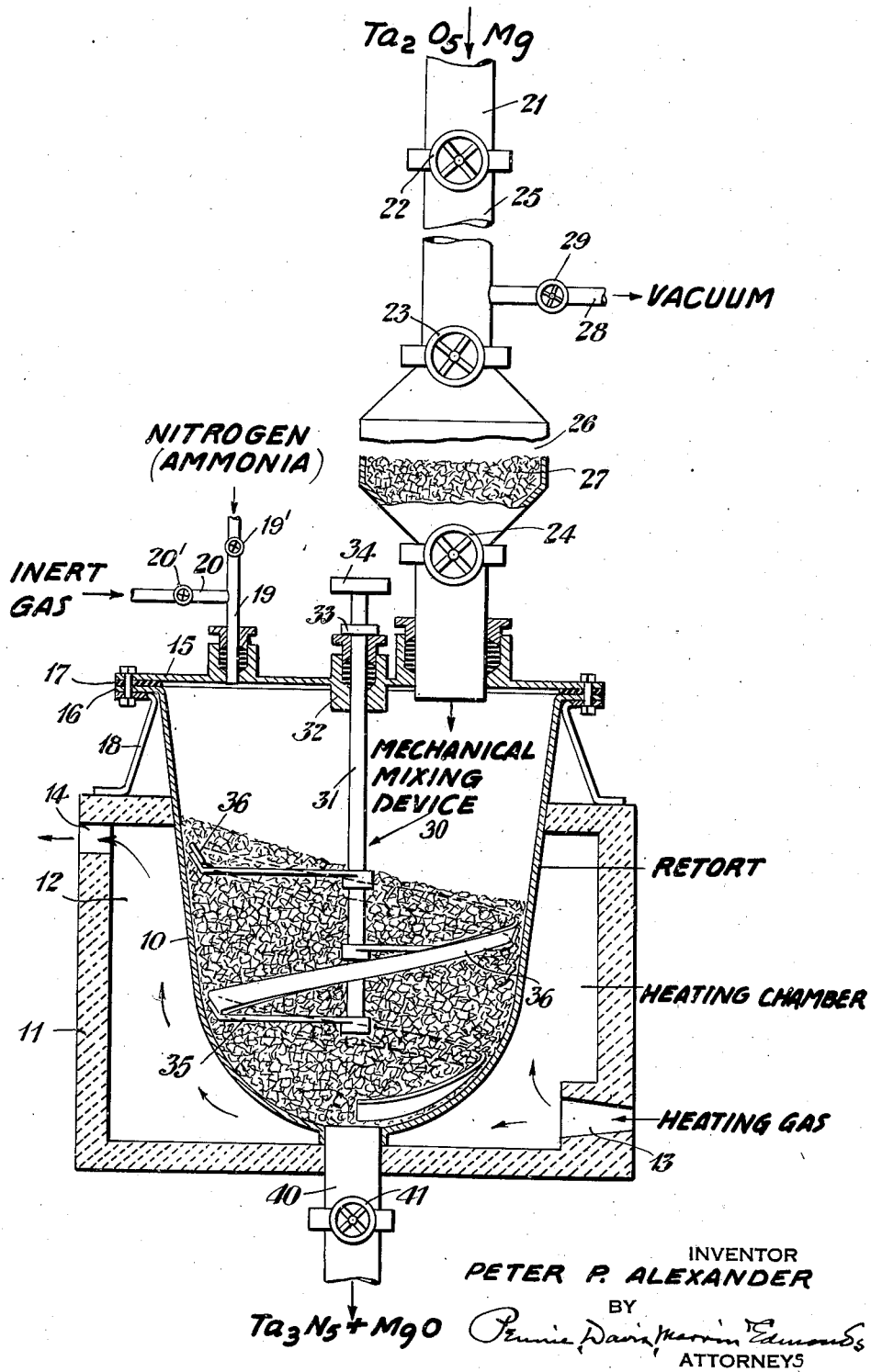

2,461,020

UNITED STATES PATENT OFFICE 2,461,020

PRODUCTION OF TANTALUM NITRIDE

Peter P. Alexander, Beverly, Mass., assignor to Metal Hydrides Incorporated, Beverly, Mass., a corporation of Massachusetts Application March 2, 1945, Serial No. 580,690

5 Claims. (Cl. 23—191)

This invention relates to tantalum nitride and has for its object certain improvements in the method of producing tantalum nitride.

It is customary in the production of tantalum nitride to pass a stream of nitrogen or ammonia over a heated body of the tantalum metal to be nitrided. If the tantalum metal is in a form of substantial size, there is a tendency for the nitriding action to take place only at the surface. If the surface of the tantalum is not clean and clear of an oxide coating, for example, the nitriding action is greatly inhibited. To overcome these difficulties, the tantalum is used in finely divided form and special precautions are taken to assure clean metallic surfaces on the individual particles. There is a marked tendency for fusion of the non-nitrided tantalum particles to take place due to excessive exothermic heat generated by the tantalum that is nitrided. As fusion of the non-nitrided tantalum sets in, the particles agglomerate and then merge into a larger body, which may take in substantially all of the particles of tantalum and tantalum nitride. In addition, the tantalum tends to fuse against the container in which the nitriding reaction is conducted. The net result is to obtain an imperfectly nitrided tantalum product, contaminated with the metal of the container, in the form of a fused mass that cannot be removed from the container without great difficulty. This method is inefficient and costly.

As a result of my investigations, I have discovered a relatively efficient and inexpensive method of producing tantalum nitride of high quality. The necessary finely divided metallic tantalum is obtained by the reduction of a finely divided tantalum compound in a suitable reaction chamber. The freshly reduced tantalum particles are then converted to the desired tantalum nitride in the same reaction chamber as part of the same operation.

In accordance with the invention, a charge of finely divided tantalum compound, such as the oxide, chloride and iodide, and a suitable reducing agent, such as a reducing metal or reducing metal compound, is confined in a reaction zone. The charge is heated to a temperature sufficiently high to reduce the tantalum compound. Nitrogen or ammonia is then admitted to the reaction zone and the reduced tantalum is converted to its nitride.

According to a presently preferred practice of the invention, the reaction zone and charge are subjected to a vacuum to remove objectionable air and moisture. To aid in the removal of the air and moisture, the reaction zone and charge are advantageously heated to a suitable elevated temperature as evacuation takes place. While the reduction operation may be conducted while the reaction zone and charge are under vacuum, the springing of a leak in the reaction chamber is apt to result promptly in the seepage of outside air and moisture into the chamber. This undesirable result may be avoided by breaking the vacuum to admit an inert gas, such as helium or argon, to the reaction zone. Enough inert gas is admitted to place the reaction zone and charge under substantial positive pressure, for example 5 pounds. If the reduction chamber should spring a leak, inert gas would tend to seep from the chamber to the outside atmosphere and thus prevent air and moisture from seeping into the reaction chamber. To maintain this balance, the positive pressure of the inert gas in the chamber is maintained by the admission of further amounts of inert gas, if necessary.

Among the reducing agents that may be employed to reduce the tantalum compounds are the alkaline earth metals—calcium, barium and strontium—and magnesium. Among the reducing metal compounds that may be employed are the reducing metal hydrides, such as the hydride of the alkaline earth metals, and particularly calcium hydride because of its availability. The charge is preferably formed of intimately admixed and finely divided particles of tantalum compound and reducing metal, such as magnesium, or reducing metal compound, the reducing agent being used in slight excess; in other words, slightly more than that theoretically required to effect reduction of all of the tantalum compound present in the charge.

The charge in the reaction zone is heated to a temperature sufficiently high to initiate and complete the reduction operation. Since the tantalum compound and the reducing agent are present in the charge in finely divided form, the resulting reduced tantalum is also in the form of finely divided particles distributed through the resulting mass of finely divided compound of the reducing agent.

To illustrate a practice of the invention, the starting material advantageously is finely divided tantalum oxide, preferably the more common tantalum pentoxide, which as made today is of high purity. Since a reducing metal such as metallic calcium, for example, cannot at present be converted readily into a finely divided form for intimate admixture with the finely divided tantalum pentoxide, it is preferable to use magnesium, which can be converted readily into a finely divided form, for example granules. Furthermore, there is less tendency to generate an excessive amount of heat when the magnesium reacts with the tantalum pentoxide, thus minimizing the problem of fusing the resulting reaction mass.

In the case of a charge of intimately admixed and finely divided tantalum pentoxide and magnesium metal particles, the reduction operation results in finely divided tantalum metal particles distributed throughout a mass of refractory magnesium oxide particles. The reaction may be indicated as follows:

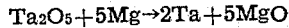

Nitrogen or ammonia is admitted to the reaction zone while the charge is still hot to convert the reduced tantalum metal to its nitride. The freshly reduced tantalum particles present substantially clean metallic surfaces, and are therefore in optimum condition for nitriding. The reduced tantalum particles are converted by the nitrogen or ammonia to tantalum nitride. The alternative reactions may be indicated as follows:

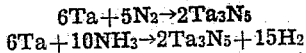

There is a considerable evolution of heat as the nitriding reaction takes place so that the temperature of the charge may be quickly elevated. Since the reduced tantalum particles are widely distributed and held more or less separately in the mass of refractory compound of the reducing metal, there is little opportunity for non-nitrided tantalum particles to fuse together. The reduced tantalum particles are widely distributed and held more or less separately in the resulting mass of refractory magnesium oxide. Even though there is a considerable evolution of heat as the nitriding reaction proceeds and the temperature of the charge rises appreciably, the fusing together of the tantalum particles is inhibited because they are separated from one another by the protective particles of magnesium oxide.

Due to the presence of a slight excess of the reducing metal, traces of oxygen present in the charge and reaction zone combine with the reducing metal and therefore protect the reduced tantalum as well as the newly formed tantalum nitride. A certain amount of the nitrogen may also combine with any reducing metal left over. For this reason, it is preferable to use the reducing metal only in slight excess, particularly when it is desired to obtain a high purity tantalum nitride product, although this is not so important in cases where the nitride of the reducing metal may be readily leached from the main tantalum nitride. Thus, magnesium nitride, if formed, may be leached from the tantalum nitride in the leaching step described below.

In a presently preferred practice, the inert gas is retained in the reaction chamber as the nitrogen or ammonia is admitted. Regulated amounts of nitrogen or ammonia may then be admitted to regulate the rate of nitriding and hence the rate of generation of exothermic heat. Objectionable overheating of the charge may thus be prevented.

To facilitate the reduction operation or the nitriding operation, or both, the charge may be mixed as it takes place. A special mixing device may be used for the purpose, or the charge may be suitably tumbled.

If the nitriding agent is ammonia, it dissociates at the high temperatures employed, and the desired nitriding action then takes place. It is thought by some that nascent nitrogen resulting from the dissociation of the ammonia has a greater affinity for the tantalum metal than normal nitrogen. My investigations lead me to believe that when ammonia is dissociated at high temperatures, it results in pure nitrogen and pure hydrogen; the pure hydrogen reacts with and removes traces of surface oxide on the tantalum metal particles to be nitrided, thus providing clean metallic surfaces; and the pure nitrogen then reacts with the tantalum metal particles to form tantalum nitride. In other words, the hydrogen of the ammonia appears to function as a scavaging agent which purifies the tantalum metal particles for reaction with the nitrogen.

The resulting reaction mass is permitted to cool, say to room temperature, in its atmosphere of nitrogen, after which the tantalum nitride is suitably separated from the compound of the reducing agent. This may be done, for example, by crushing the reaction mass, if necessary, and leaching out the compound of the reducing agent with a suitable solvent, such as a dilute solution of a suitable acid, for example hydrochloric, sulfuric or acetic acid; or a solution of an ammonium salt. The wet tantalum nitride is then dried and stored for use.

These and other features of the invention will be better understood by referring to the accompanying drawing, taken in conjunction with the following description, which illustrates diagrammatically an apparatus usable in a practice of the invention.

The apparatus shown comprises a pot retort 10 suitably suspended within a furnace 11 having a heating chamber 12 with a conduit 13 near the bottom through which to introduce heating gases into the chamber; and a flue opening 14 near the top thereof through which to remove spent gases from the chamber. The retort is advantageously made of heat-resistant steel. It is provided with a removable cover 15, which may be bolted to a flange 16 extending circumferentially around the open end of the retort, a gasket 17 being disposed between the two to provide a non-leaking joint. The retort is suspended in the chamber by means of a plurality of spaced supports 18 extending circumferentially of the retort between the flange and the top of the furnace.

The cover is provided with a pipe 19 having a valve 19' for the controlled passage of nitrogen or ammonia, a pipe 20 having a valve 20' connecting the other pipe for the controlled passage of inert gas, such as helium or argon, into the retort; a charging conduit 21 to supply tantalum compound, such as tantalum pentoxide, and a reducing agent, such as magnesium, to the interior of the retort. As shown, the conduit is fitted with three spaced valves 22, 23 and 24, to provide an evacuating passageway 25 and a trap 26 of sufficient size to receive a substantial charge, for example, of intimately admixed tantalum pentoxide and magnesium 27. A pipe 28 with a valve 29 connects the evacuating passageway with a source of vacuum, not shown.

A mechanical mixing device 30 fits within the interior of the retort. It is provided with a vertical shaft 31, the upper end of which extends through the cover and is suitably held in position by a bearing 32 and a collar 33 secured to the shaft. The upper end of the shaft is also equipped with a pulley 34 connectible with a source of power, not shown.

A mechanical mixing device 30 fits within the interior of the retort. It is provided with a vertical shaft 31, the upper end of which extends through the cover and is suitably held in position by a bearing 32 and a collar 33 secured to the shaft. The upper end of the shaft is also equipped with a pulley 34 connectible with a source of power, not shown. The lower part of the shaft is fitted with a plurality of lateral supports 35 to which is attached a helical metallic ribbon 36 adapted to follow the contour of the inside of the retort so as to raise charge materials confined therein along the inside surface of the retort, and then to roll them toward the center, thereby intimately mixing the charge materials.

A discharge conduit 40 connects with the bottom of the retort and extends through the bottom of the furnace. A valve 41 is provided in the conduit below the furnace bottom for the removal of residues from the retort.

In accordance with a practice of the invention, cover 15 is appropriately bolted to flange 16 to assure a sealed joint. Heating gases are passed through conduit 13 into heating chamber 12, so that the bottom of retort 10 is heated. Spent heating gases escape through flue opening 14. Valves 24, 23 and 29 are opened and valves 19', 20', 22 and 41 are closed until the air, moisture and other gaseous products are evacuated from the interior of the retort. This may be accomplished by connecting conduit 28 with a vacuum pump, not shown. To hasten the evacuation step, the temperature of the interior of the retort is suitably raised. The charge may also be mixed, by rotating device 30 as it is placed under vacuum to help remove air and moisture.

On completion of the evacuation step, valves 24 and 29 are closed, valve 22 is opened and charge 27 of finely divided tantalum pentoxide and magnesium, in slight excess, is passed into conduit 21 and dropped into trap 26; after which valve 22 is closed and valve 29 is opened to evacuate air and moisture from trap 26 and charge 27. Valves 23 and 29 are then closed and valve 24 is opened so that the charge is dropped into the retort.

Additional heating gases are passed into heating chamber 12 to raise the temperature of the charge within retort 10 to a temperature at which the reduction of the tantalum pentoxide by the magnesium may proceed satisfactorily. Device 30 is rotated to mix the charge intimately. While the temperature may be checked in various ways, it is practical to employ a hollow shaft 31, in which is placed a suitable thermocouple.

In a presently preferred practice, valve 20' is opened, after charge 27 is dropped into retort 10 and valve 24 is closed, to admit inert gas, such as helium or argon, or both, in amount sufficient to place and maintain the reaction zone under substantial positive pressure, for example 5 pounds. The charge is then heated and mixed before and during the reduction reaction.

As the tantalum pentoxide particles are reduced, the resulting metallic tantalum particles are distributed throughout the resulting mass of magnesium oxide particles. The magnesium oxide particles tend to separate the reduced tantalum particles. In other words, the tantalum particles have limited opportunity to contact one another because they are suspended in a mass of magnesium oxide particles.

Valve 19' is then opened to admit controlled amounts of nitrogen gas or ammonia to the interior of the retort. Unless the temperature of the reaction mass within the retort is insufficient to initiate the nitriding reaction between the freshly reduced tantalum particles and the nitrogen or ammonia, introduction of further heating gases into the heating chamber is terminated. As pointed out above, the reaction between tantalum and nitrogen is an exothermic one and, unless special precautions are taken, objectionable overheating tends to take place, thereby causing fusion of the tantalum particles and impairment of the nitriding reaction. To prevent this undesirable result, the tantalum particles are nitrided as they are distributed in and among the magnesium oxide particles.

In a preferred practice, the inert gas is retained in the retort so that the nitrogen or ammonia may be admixed and diluted therewith. If the inert gas in the retort is maintained at an optimum pressure, the amount of exothermic heat released by the nitriding reaction may be controlled by regulating the rate at which nitrogen or ammonia is admitted to the retort. This may be done automatically by feeding additional amounts of nitrogen or ammonia to the retort when the pressure within the retort falls below a predetermined level, but not in amount to exceed a predetermined level, the range being such as to limit the supply of nitrogen or ammonia to an amount which is insufficient to raise the temperature to an objectionable extent. A sufficient amount of nitrogen or ammonia is thus admitted to effect complete conversion of the reduced tantalum to tantalum nitride. The nitriding reaction is completed when there is no call for additional nitrogen or ammonia.

The retort and its contents are then permitted to cool. Valves 19' and 20' are closed and cover 15 is removed. The tantalum nitride and magnesium oxide are then removed from the retort. This may be done by opening valve 41 and rotating the mixing device, when the reaction mass is discharged through conduit 40. The reaction mass is crushed, if desired, and leached with dilute acid, such as hydrochloric, sulfuric or acetic acid, or a solution of an ammonium salt. The acid or ammonium salt dissolves out the magnesium oxide, as well as any magnesium nitride that may have formed, leaving the tantalum nitride, which is dried and stored for use.

It will be clear to those skilled in this art that the above example is only by way of illustration; that the practice of the invention readily lends itself to a number of useful modifications; and that the invention offers a relatively efficient and inexpensive method of producing tantalum nitride.

Reference may be made to my three (3) copending applications filed March 2, 1945, which also relate to metal nitrides: Serial Nos. 580,687; 580,688; and 580,689; the claims of which are directed broadly to the production of metal nitrides and specifically to the nitrides of titanium and zirconium, respectively.

I claim:

1. A method for producing tantalum nitride which comprises confining in a reaction zone a charge of an intimate mixture in finely divided form of tantalum oxide and a metal containing reducing agent capable of forming a refractory metal oxide by reduction of the tantalum oxide, heating the charge sufficiently high to reduce the tantalum oxide by reaction with said reducing agent and form a reaction mass in which finely divided particles of tantalum metal are distributed and held in a mass of particles of refractory oxide, then admitting to the reaction zone a gas selected from the group consisting of nitrogen and ammonia, and converting the tantalum metal to tantalum nitride while distributed and held in the protective refractory oxide.

2. A method for producing tantalum nitride which comprises confining in a reaction zone a charge of an intimate mixture in finely divided form of tantalum oxide and a metal hydride, heating the charge sufficiently high to reduce the tantalum oxide by reaction with said metal hydride and form a reaction mass in which finely divided particles of tantalum metal are distributed and held in a mass of particles of refractory oxide, then admitting to the reaction zone a gas selected from the group consisting of nitrogen and ammonia, and converting the tantalum metal to tantalum nitride while distributed and held in the protective refractory oxide.

3. A method for producing tantalum nitride which comprises confining in a reaction zone a charge of an intimate mixture in finely divided form of tantalum oxide and a reducing metal, heating the charge sufficiently high to reduce the tantalum oxide by reaction with said reducing metal and form a reaction mass in which finely divided particles of tantalum metal are distributed and held in a mass of particles of refractory oxide, then admitting to the reaction zone a gas selected from the group consisting of nitrogen and ammonia, and converting the tantalum metal to tantalum nitride while distributed and held in the protective refractory oxide.

4. A method for producing tantalum nitride which comprises confining in a reaction zone a charge of an intimate mixture in finely divided form of tantalum oxide and calcium hydride, heating the charge sufficiently high to reduce the tantalum oxide by reaction with said calcium hydride and form a reaction mass in which finely divided particles of tantalum metal are distributed and held in a mass of particles of refractory oxide, then admitting to the reaction zone a gas selected from the group consisting of nitrogen and ammonia, and converting the tantalum metal to tantalum nitride while distributed and held in the protective refractory oxide.

5. A method for producing tantalum nitride which comprises confining in a reaction zone a charge of an intimate mixture in finely divided form of tantalum oxide and magnesium, heating the charge sufficiently high to reduce the tantalum oxide by reaction with said magnesium and form a reaction mass in which finely divided particles of tantalum metal are distributed and held in a mass of particles of refractory oxide, then admitting to the reaction zone a gas selected from the group consisting of nitrogen and ammonia, and converting the tantalum metal to tantalum nitride while distributed and held in the protective refractory oxide.

PETER P. ALEXANDER.

REFERENCES CITED

The following references are of record in the file of this patent:

UNITED STATES PATENTS

| Number | Name | Date |
|---|---|---|
| 996,032 | Serpek | June 20, 1911 |
| 1,077,712 | Heyder | Nov. 4, 1913 |
| 1,088,909 | Kuzel | Mar. 3, 1914 |
| 1,180,840 | Giulini | Apr. 25, 1916 |
| 1,274,797 | Shoeld | Aug. 6, 1918 |
| 1,343,441 | Farup | June 15, 1920 |
| 1,366,720 | DeLoisy | Jan. 25, 1921 |
| 1,533,505 | Lubowski | Apr. 14, 1925 |
| 1,803,720 | Miner | May 5, 1931 |

OTHER REFERENCES

Chemical Abstracts, vol. 35, 1941, page 4712[1].